Jan. 27, 1953 B. LIEBOWITZ Re. 23,617

ANTICURL DEVICE FOR COLLARS

Original Filed Sept. 24, 1951 3 Sheets-Sheet 1

INVENTOR.
BENJAMIN LIEBOWITZ
BY
Michael S. Striker

ANTICURL DEVICE FOR COLLARS

Original Filed Sept. 24, 1951 3 Sheets-Sheet 2

INVENTOR.
BENJAMIN LIEBOWITZ
BY

ANTICURL DEVICE FOR COLLARS

Original Filed Sept. 24, 1951 3 Sheets-Sheet 3

INVENTOR.
BENJAMIN LIEBOWITZ
BY

Reissued Jan. 27, 1953

Re. 23,617

UNITED STATES PATENT OFFICE 23,617

ANTICURL DEVICE FOR COLLARS

Benjamin Liebowitz, Lewisboro, N. Y.

Original No. 2,601,038, dated June 17, 1952, Serial No. 247,910, September 24, 1951. Application for reissue July 30, 1952, Serial No. 301,813

16 Claims. (Cl. 2—132)

Matter enclosed in heavy brackets [ ] appears in the original patent but forms no part of this reissue specification; matter printed in italics indicates the additions made by reissue.

One of the most outstanding problems in the collar industry has been that of eliminating the tendency of the points thereof to curl away from the body of the wearer.

In my copending application Serial No. 190,092, filed October 14, 1950, *now Patent No. 2,601,035, dated June 17, 1952* I have disclosed a very satisfactory method of solving this problem by the use of a bielastic structure incorporated in the collar. This bielastic structure comprises a flexible member permanently resistant to compression along its length and an elastic member secured in permanently stretched tension-producing state to one side of the compression-resistant member. The present application is a continuation-in-part of the aforesaid copending application. Various modifications of the bielastic structure are disclosed and claimed in this application.

For a better understanding of the invention reference is made to the accompanying drawing, in which.

Figure 1:
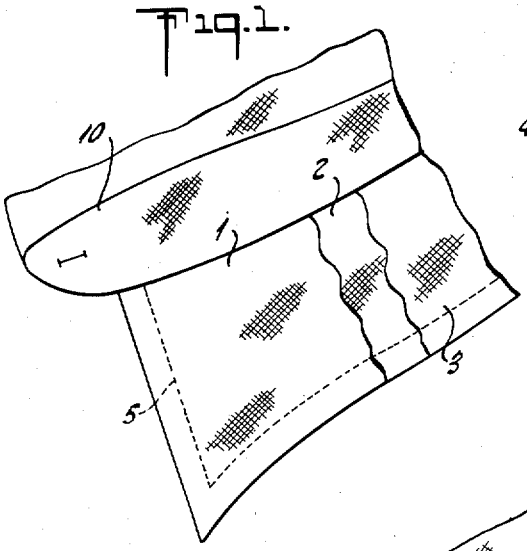
Fig. 1 is a fragmentary plan view of a conventional collar with collarband attached thereto.

Figure 1 shows a fragmentary plan view of a conventional collartop which may be made, for example, by the procedure of "running-and-turning" as is well-known in the industry. This collar comprises three plies, viz., a face ply 1, a lining ply 2, and a back ply 3. As usual, the collartop is attached to a band portion marked 10.

Figure 2:
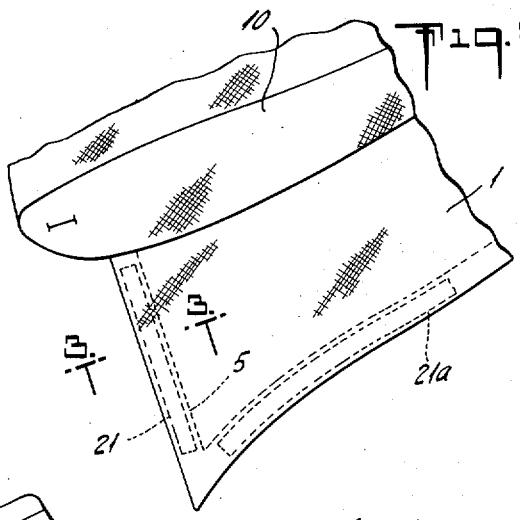
Fig. 2 is a fragmentary plan view of a collar like in Fig. 1, but showing the location of the bielastic strips in the edges thereof; the collar of this figure is fused.

Figure 2 is a fragmentary plan view of a collar as shown in Figure 1, in which is indicated the location of the anticurl strips by dashed lines labeled 21 and 21a.

Figure 3:
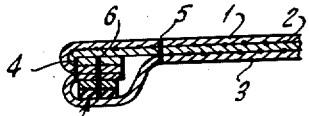
Fig. 3 is a cross-section on the line III—III of Fig. 2 showing the location and attachment of the bielastic strips in section.

Figure 3 is a cross-section on the line III—III of Figure 2, in which I have indicated more specifically the location and cross-sectional shape of the anticurl strip 21. In this figure, 1 represents the face ply, 2 the lining ply, and 3 the back ply, as in Figure 1. These plies are held together by the inside seam 4 and subsequently may be held further together by the external stitch 5 which is customarily placed near the edge. The anticurl strip 21 is located between the stitch 5 which is customarily placed near the edge. The anticurl strip is located between the stitch 5 and the edge of the collar and is attached before turning of the collar by stitch 6 to the edge of the collar which is subsequently turned in as indicated in Figure 3, so that the bielastic strip is ultimately concealed and protected by the back ply 3. It is important to note that the rubber face of the bielastic strip 21 faces the back ply.

Figure 4:
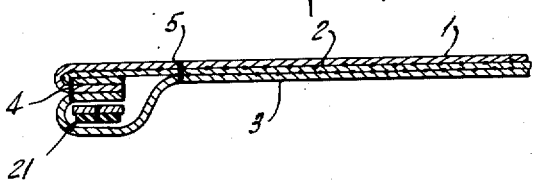
Fig. 4 is a cross-section of a fused collar like Fig. 3 but differs in that the bielastic strip merely lies in a pocket and is otherwise unfastened.

Figure 4 is a cross-section just like Figure 3 with this difference, viz., that the stitch 6 is omitted. That is, in Figure 4, the bielastic strip 21 merely lies in the pocket formed by the "top-stitch" 5 and the "inside stitch" 4, and is otherwise unattached. In this case the bielastic strip is inserted after completion of the collar top.

The structure shown in Figures 2, 3, and 4 is particularly adapted to so-called fused collars. (The fusing is schematically indicated by dots.) It may also be employed with so-called soft collars, but for good results the region in the neighborhood of the points should be stiffened.

Figure 5:
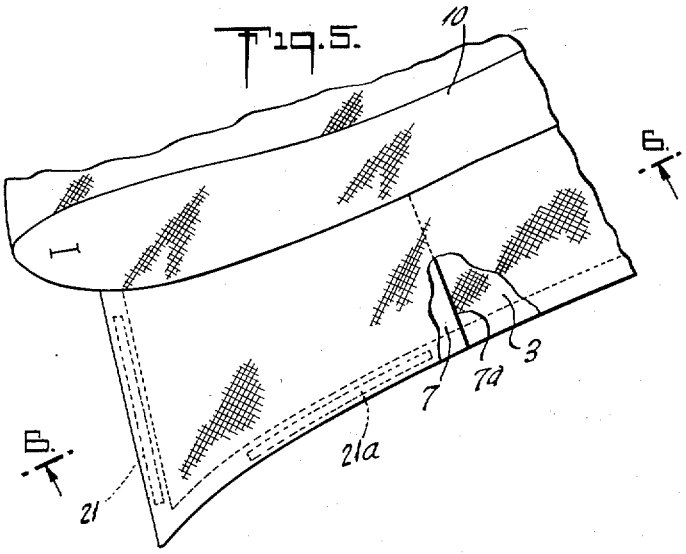
Fig. 5 is a plan view of a non-fused collar which has end portions stiffened by fusing.
Figure 6:
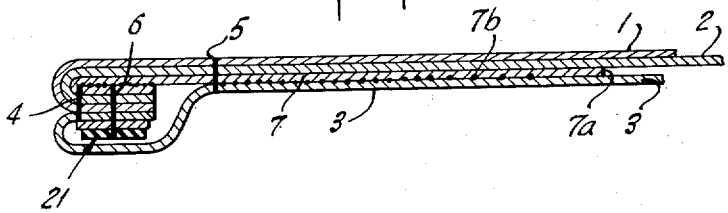
Fig. 6 is a cross section on the line VI—VI of Fig. 5 showing a fused layer 2 of fabric with "tapered" end to produce the local stiffening.

Figure 5 is a plan view and Figure 6 a cross-section of a soft or non-fused collar in which is shown an extra layer of stiffening lining 7 next the back ply 3. As indicated by the dots, this extra layer of stiffening lining may be fused to the back ply 3. In the embodiment of Figures 5 and 6 I prefer to "taper" the extra inserted lining 7 so as to minimize the showing on the face of the finished collar of the discontinuity formed by the edge 7a of the stiffening lining 7. I achieve this "tapering" in the form shown in Figure 6 first by reducing the number of fusible yarns in the fusing lining 7 as one approaches the edge 7a and leaving the neighborhood of the edge 7a unfused as indicated by the dots 7b; secondly, I prefer to weave the material of lining 7 as a narrow fabric and to so cut it that the edge 7a is a selvage; and thirdly, I prefer to reduce the number and/or size of cotton warp ends as the selvage 7a is approached. Furthermore, I prefer to have the lining 7 adhere on one face only, i. e. to the back ply 3, and not to the ordinary lining ply 2. For this purpose the material of lining 7 may be "satinized," i. e. most of the fusible yarn substance is thrown on one face in the weaving.

However, the stiffening in the neighborhood of the points may be obtained in ways other than fusing; for example, in place of the satinized fusing lining 7, I may employ ordinary lining materials stiffened permanently by treatment with appropriate resins, e. g. epoxy resin. The said extra piece of lining 7 may be inserted only in the neighborhood of the collar points, or, if desired, it may extend the full length of the collar.

Figure 7:
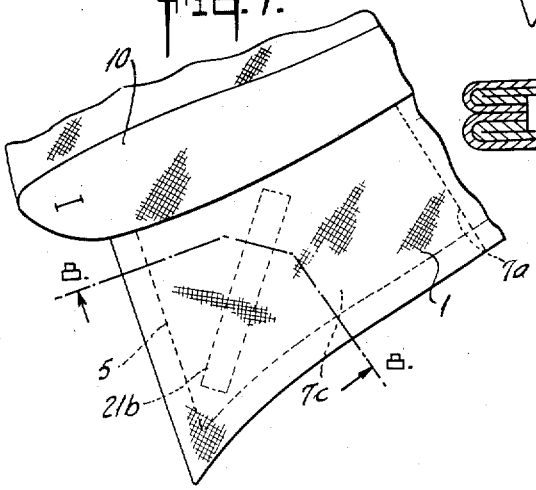
Fig. 7 is a fragmentary plan view of a collar showing the location of a bielastic strip in a diagonal position.

In Figure 7, I have shown at 21b an alternative location of a bielastic anticurl strip 21b, viz., on a diagonal.

Figure 8:
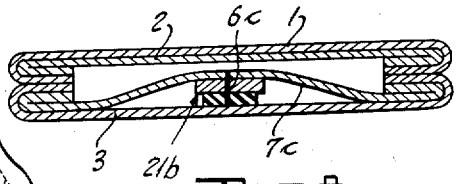
Fig. 8 is a cross-section on the line VIII—VIII of Fig. 7.

Figure 8 is a cross-section on the line VIII—VIII of Figure 7 showing how the bielastic anticurl strip at 21b is located in the collar. Here again an extra piece of lining is employed as shown at 7c in order to prevent the anticurl strip 21b from too noticeably showing through on the face of the collar. Preferably, the extra lining 7c is stiffened but not fused. The bielastic strip 21 is sewn as indicated by 6c to the lining 7c. The structure shown in Figures 7 and 8 is intended primarily for non-fused collars. The lining 7c may be "tapered" by weaving it as a narrow fabric, so cutting it that the edge 7a of Figure 7 is a selvage and reducing the size and a number of warp ends as the selvage is approached.

In all cases, the bielastic anticurl strip comprises, as mentioned above, a flexible element permanently resistant to compression along its length and a stretched elastic element secured in permanently tension-creating condition to the compression-resistant element.

Figure 9:
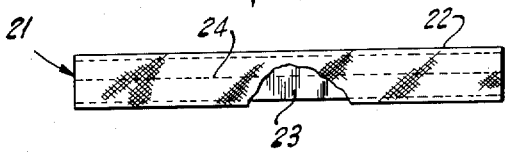
Fig. 9 is a plan view.
Figure 11:
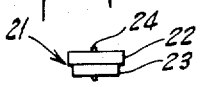
Figure 10:
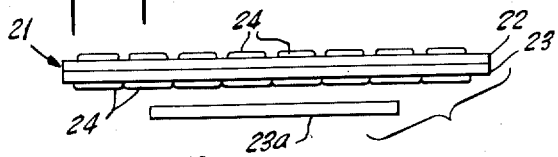
Fig. 10 is a side elevation, and Fig. 11 an end elevation of one form of a bielastic strip.

An embodiment of the anticurl strip or bielastic structure 21 is shown in Figures 9, 10, and 11; in this embodiment, the anticurl strip comprises a cotton tape 22 stiffened to endow it with compression resistance. This tape may be about ⅛" wide and about 0.008 to 0.010" thick, for example. Secured to this cotton strip by the stitch 24 is a rubber tape 23 whose initial length is approximately indicated, as an example, just below the elevation of Figure 10 by the strip 23A. That is to say, the tape 23A before attaching to the cotton tape 22 has a length, for example, of some 60 to 70% of its stretched length after incorporation in the bielastic structure. It must be emphasized, however, that the amount of stretch of the rubber tape is highly variable, depending on the quality of the rubber, its cross-sectional area, and the kind of collar and collar fabric into which it is to be put. The rubber tape may be of the order of ⅛" wide and may have a thickness e. g. of about 0.010" to 0.012". The quality of rubber tape known in the trade as "garment tape" is suitable. The structure shown in Figures 9 to 12, inclusive, has been found to work very satisfactorily in fused collars. I have found that in some cases it is sufficient to use the bielastic strip 21 only in the region shown at 21 in Figure 2, although it may also be used in the region shown at 21a in Figure 2.

A suitable stiffening material for the cotton tape I have found to be the so-called epoxy resins or polyester resins. However, a less permanent stiffening can also be employed in fused collars where the fused material to which the bielastic strip is sewn furnishes some of the compression-resistance.

Figure 12:
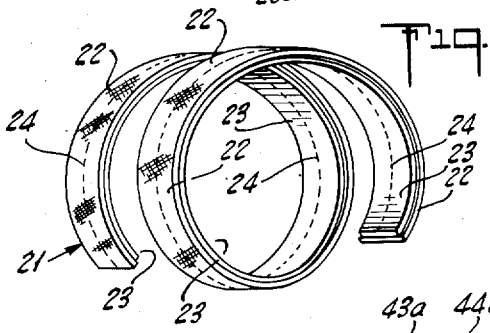
Fig. 12 illustrates the curled shape taken by the bielastic strip after it is completed and before it is attached to or inserted in the collar.

For ease of illustration, the bielastic strip of Figures 9 and 10 is shown in a straightened configuration more or less like the configuration it assumes in the finished collar. But when such strips are free, they assume a helical shape as illustrated in Figure 12. The diameter of the helix thus formed may be, for example, ⅜ to 1" or more in a bielastic strip intended for fused collars.

Small accidental variations in stitching the rubber tape to the cotton tape may cause small lateral distortions of the resulting bielastic strip. This tendency to distort may result in some distortion of the collar. On this account I prefer to have the compression-resistant element relatively stiff and stable against bending in its own plane.

Experimentally I find that the required amount of lateral stability is achieved by the same treatment with resin which confers compression-resistance on the cotton tape.

It will be obvious that in place of the garment tape 23 sewn to a cotton tape I may use a plurality of rubber yarns interwoven in the process of weaving the cotton tape. This modification is shown in cross-section in Figure 13 where 41 represents a series of cotton warp yarns, 42 represents a series of rubber warp yarns which are stretched so that after the completion and the stiffening of the bielastic structure the yarns 42 will have the required stretch, that is to say, they will be stretched, for example, something like 30 to 60% (more or less) of their original length beyond their original length.

Figure 13:
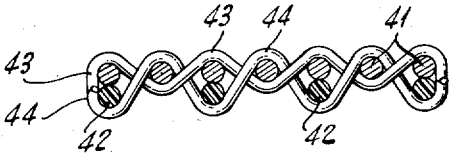
Fig. 13 is a cross-sectional view showing a modification of the bielastic strip structure.

In Figure 13, 43 represents weft yarns which hold the warp yarns together to form the body of the fabric tape. 44 represents the weft yarn used to interweave the rubber yarn. In practice, every fourth weft yarn may be of the character 44, whereas the other three are of the character 43.

The structure shown in Figure 13 will tend to collapse as it comes from the looms. In order to convert it into satisfactorily usable anticurl strip.

it must then be stretched out and stiffened in the stretched condition, so as to confer the compression-resistance required.

Figure 14:
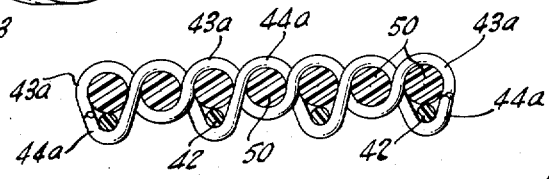
Fig. 14 is a cross-sectional view showing another modification of the bielastic strip structure.

It is unnecessary to stiffen the interwoven bielastic structure shown in Figure 13 if the warp ends 41, instead of being made of cotton, are made of a suitable monofil as shown at 50 in Figure 14. A suitable monofil for this purpose is nylon monofil of about 0.010'' in diameter. It is preferable in this case to make the wefts 43A and 44A of nylon yarn instead of cotton. This structure, however, is not easy to weave on account of slippage.

Figure 15:
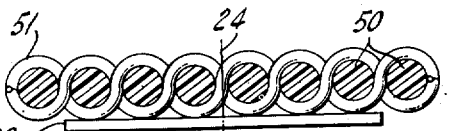
Fig. 15 is a cross-section showing still another modification of the bielastic strip structure.

In Figure 15, I have shown a modification in which a nylon tape is used whose warps 50 are monofils about 0.010'' in diameter and whose weft yarns 51 are ordinary nylon yarns of about 150 to 200 denier, more or less. A rubber strip 23 is sewn to this nylon tape by the stitch 24, just as in Figures 9, 10 and 11. It will be understood once again that the rubber strip 23 is appropriately strentched at the time it is sewn to the nylon tape. I have found that resins may be employed as adhesive to fix the weft yarns against slippage.

Figure 17:
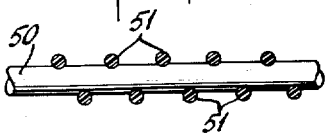
Fig. 17 is a longitudinal cross-section of a woven flexible compression-resistant member using monofils in the warp showing how the same may be stabilized against slippage of weft yarns.
Figure 16:
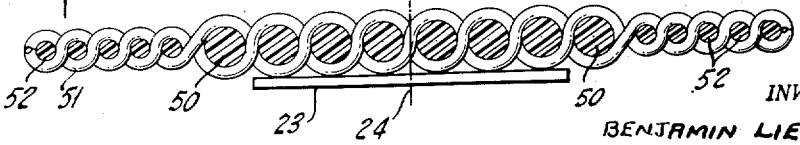
Fig. 16 is a cross-section showing still a further modification.

It will be understood that instead of fixing the nylon weft yarns against slippage by means of a resin, the same or similar result can also be accomplished by means of heat and pressure so that the weft yarns become embedded in the monofils, as shown in longitudinal cross-section in Figure 17 where, corresponding to Figures 15 and 16, 51 indictes the weft yarns and 50 indicates the warp monofils in which the weft yarns have been embedded by the application of heat and pressure.

All of the bielastic structures shown up to this point may be used in the locations at 21—21a shown in Figure 2. In order to make them more suitable for use in the location 21b indicated in Figure 7 (particularly intended for non-fused collars), it is desirable to "taper" the edge of the bielastic strip in order to minimize the extent to which the strip will show on the finished collar. This can be done by employing the structure shown in cross-section in Figure 16, which is just like that shown in Figure 15 except for the use of ordinary nylon warp yarns of relatively small diameter (compared with the monofils 50) on either side of the portion formed by said monofis. That is, in Figure 16 I have, as is shown in Figure 15, the nylon monofils 50 and the stretched rubber strip 23 attached by means of the stitch 24, and also a group of ordinary nylon warp yarns on each side shown at 52, all said warp yarns being woven into a ribbon by the weft yarns 51. The added warp yarns 52 may be of 100 to 150 denier, for example. Again it will be understood that the nylon ribbon thus formed is fixed so as to prevent sliding of the weft yarns on the warp yarns by means of an appropriate resin. This fixing also imparts a lateral stability which I have found particularly desirable in non-fused collars.

Figure 18:
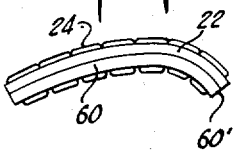
Fig. 18 is a side view of a bielastic structure incorporating a rubber band with varying tension.

Experimentally it has been found that in order to obtain good results the anticurling strength of the bielastic structures heretofore described must be rather carefully adjusted to the collar or other article of apparel in which it is to be used. Thus, if the anticurling strength is too strong, it will create a tendency of the collar points, for example, to curl inward toward the wearer, which is not very desirable; on the other hand, if it is insufficient it will not prevent the curling tendency of the collar away from the wearer to the extent that is desired. It has been found that a much wider latitude in curling strength is permissible if the tension of the stretched elastic element is made variable along the length of the bielastic strip. The effect of such variable tension is illustrated in a side elevation in Figure 18 in which as before 22 represents a flexible fabric strip stiffened so as to make it compression-resistant. 60 represents the stretched elastic member which is sewn to the element 22 by the stitch 24. But the tension in the stretched elastic element increases as one passes from left to right so that at the right-hand end 60' the tension in this stretched elastic element is considerably greater than at the left-hand end. Thus, as indicated in Figure 18, the curling strength increases as one passes from left to right in Figure 18. The right-hand end is placed near the crotch of the collar shown in Figure 2, that is, close to the junction of the collartop and the band 10 in the location indicated at 21 in Figure 2; the other end is therefore in the neighborhood of the point. The effect of this is to give a strong anticurling tendency to the collar in the neighborhood of the crotch thereby causing the edge of the collar to hug the body better. Moreover, the greater anticurling tendency in the neighborhood of the crotch will tend to overpower any excess anticurling tendency near the point thereby minimizing any tendency that the points may have to curve inward because of the anticurling forces. Thus, the use of a variable tension in the rubber represents a significant improvement in the anticurl structure.

In the case of uniform tension of the stretched elastic element as shown in connection with Figures 9 to 12, inclusive, the desired uniform stretch may be obtained when sewing the stiffened cottom tape 22 to the stretched rubber tape 23 by passing the cotton tape over a roll of defiite diameter and passing the rubber tape over another roll of smaller diameter which is coaxial with the first roll, in each case pressing the tape against the corresponding roll by means of idler rolls. This arrangement provides a constant differential feed which produced the uniform stretch of the rubber as described in connection with Figures 9 to 12, inclusive. In order to obtain the variable tension in the elastic element illustrated in Figure 18, the smaller roll which determines the rate of feed of the rubber tape, instead of being coaxial with respect to the other roll, may be made eccentric with respect thereto, so that the rate of feed of the stretched elastic element will vary periodically, the period being determined by the length of bielastic strip into which the finished anticurl tape is to be cut up.

It will be recognized that the variable curvature inducing force which produces the result illustrated in Figure 18 arises from variable contractile force exerted by the stretched elastic element along the length of the anticurl strip, which variable contractile force arises from the variable elongation as described.

Of course, such variations of contractile force can be obtained in other ways, for instance, by varying the width or thickness of the rubber tape periodically (with periods equal to the ultimate length of the anticurl strip) and maintaining constant elongation in attaching the rubber strip to the stiffened cotton tape. Or a variation in curling tendency can be obtained by varying the stiffness of the compression-resistant element, for example by periodically varying the amount of resin applied to the continuous tape while it is in the process of being stiffened. But so far as can be seen at present, the method described above of maintianing a constant cross-section of the rubber tape and varying its elongation periodically is by far the best from the manufacturing standpoint.

It will be understood that the bielastic structure having variable anticurling strength may be employed in other garments besides collars, for instance girdles, in which case the portion of the anticurling strip having the weakest curling strength would lie in the neighborhood of the top edge of the girdle and the strip itself would run downward from this top edge.

The word "compression-resistant" is used throughout this specification and the following claims in the sense that the object in question will not buckle or tend to shorten continuously under the compressive force induced by the stretched elastic element. For example, ordinary lightweight fabrics would not be compression-resistant in this sense because they would tend partly to buckle and more important would tend to shorten permanently after repeated washings. In this sense such lightweight ordinary fabrics are not compression-resistant. However, the compression-resistant element may yield substantially under the compressive force induced by the stretched elastic element and still come within the ambit of the meaning of the expression "compression-resistant" as used herein. For instance, a practical way, for certain purposes, to make a bielastic element is to employ two strips of rubber one of which is properly stretched before cementing or otherwise applying it to the other. The other strip of rubber, which acts as the compression-resistant element, should preferably be thicker than the stretched elastic member or it should be made of a rubber of higher durometer hardness, or both. It is understood that the term "compression-resistant member" is intended to cover also substances of the sort which, after having once been initially compressed by the initial tension of the stretched elastic member, will not subsequently tend to shorten to any material extent, and will not, moreover, tend to buckle.

The invention described above is partially disclosed in my U. S. patent application Serial No. 199,317, filed December 5, 1950, *now Patent No. 2,601,036, dated June 17, 1952,* and my U. S. patent application Serial No. 217,341, filed March 24, 1951, *now Patent No. 2,601,037, dated June 17, 1952.*

What is claimed as new and desired to be secured by Letters Patent is:

1. A device for inducing a curving tendency in a desired direction in a portion of an article of apparel with which said device is eventually assembled, said device comprising in combination a flexible fabric strip including at least one monofilament consisting of plastic material and being compression-resistant in axial direction, said monofilament extending in longitudinal direction of said fabric strip and being incorporated therein so as to make said fabric strip compression-resistant, and an elastic strip-shaped element fastened to one face of said flexible compression-resistant fabric strip in permanently stretched tension-creating condition so as to induce curvature in said compression-resistant flexible fabric strip and hence a curving tendency in a portion of an article of wearing apparel with which the same is assembled, said curvature being in the direction of that face of said compression-resistant flexible fabric strip to which the said elastic strip-shaped element is fastened.

2. A device for inducing a curving tendency in a desired direction in a portion of an article of apparel with which said device is eventually assembled, said device comprising in combination a flexible compression-resistant fabric strip; and a plurality of parallel elastic strands each fastened to one and the same face of said flexible compression-resistant fabric strip in permanently stretched tension-creating condition so as to induce curvature in said compression-resistant flexible fabric strip and hence a curving tendency in a portion of an article of wearing apparel with which the same is assembled, said curvature being in the direction of that face of said compression-resistant flexible fabric strip to which the said elastic strands are fastened.

3. A device for inducing a curving tendency in a desired direction in a portion of an article of apparel with which said device is eventually assembled, said device comprising in combination a thin flexible compression-resistant element; and a stretched elastic element having a tension varying along its length and fastened in such stretched tension-creating condition to one face of said thin flexible compression-resistant element, thus inducing different curvatures in said thin flexible compression-resistant element along the length thereof and hence inducing a curving tendency in a portion of an article of wearing apparel with which the same is assembled, said curving tendency varying along the length of said thin flexible compression-resistant element and being in the direction of that face of said thin flexible compression resistant element to which the said elastic element is fastened.

4. A device for inducing a curving tendency in a desired direction in a portion of an article of apparel with which said device is eventually assembled, said device comprising in combination a thin flexible compression-resistant fabric strip; and a stretched elastic element having a tension varying along its length and fastened in such stretched tension-creating condition to one face of said thin flexible compression-resistant fabric strip, thus inducing different curvatures in said thin flexible compression-resistant fabric strip along the length thereof and hence inducing a curving tendency in a portion of an article of wearing apparel with which the same is assembled, said curving tendency varying along the length of said thin flexible compression-resistant fabric strip and being in the direction of that face of said thin flexible compression-resistant fabric strip to which the said elastic element is fastened.

5. A device for inducing a curving tendency in a desired direction in a portion of an article of apparel with which said device is eventually assembled, said device comprising in combination a thin flexible compression-resistant strip-shaped element; and a stretched elastic-strip-shaped element having a tension varying along its length and fastened in such stretched tension-creating condition to one face of said thin flexible compression-resistant strip-shaped element, thus inducing different curvatures in said thin flexible compression-resistant strip-shaped element along the length thereof and hence inducing a curving tendency in a portion of an article of wearing apparel with which the same is assembled, said curving tendency varying along the length of said thin flexible compression-resistant strip-shaped element and being in the direction of that face of said thin flexible compression-resistant strip-shaped element to which the said elastic strip-shaped element is fastened.

6. A strip-shaped device for inducing a curving tendency in a desired direction in a portion of an article of apparel with which said device is eventually assembled, said device comprising in combination a thin flexible compression-resistant strip; and a stretched elastic strip-shaped element having a stretch diminishing from a maximum in the region of one end to a minimum in the region of the other end of said strip-shaped element and fastened in such stretched tension-creating condition to one face of said thin flexible compression-resistant strip, thus inducing diminishing curvatures in said thin flexible compression-resistant strip along the length thereof and hence inducing a curving tendency in a portion of an article of wearing apparel with which the same is assembled, said curving tendency diminishing along the length of said thin flexible compression-resistant element and being in the direction of that face of said thin flexible compression-resistant strip to which the said elastic strip-shaped element is fastened.

7. A device for inducing a curving tendency in a desired direction in a portion of an article of apparel with which said device is eventually assembled, said device comprising in combination a thin flexible compression-resistant strip; and a stretched elastic element having a tension diminishing from a maximum in the region of one end to a minimum in the region of the other end of said elastic element and fastened in such stretched tension-creating condition to one face of said thin flexible compression-resistant strip, said elastic element thus inducing different curvatures in said thin flexible compression-resistant strip along the length thereof and hence inducing a curving tendency in a portion of an article of wearing apparel with which the same is assembled, said curving tendency varying along the strip and being in the direction of that face of said thin flexible compression-resistant strip to which the said elastic element is fastened.

8. In a collar consisting of one or more fabric plies, means for opposing the tendency of a collar point to curl away from the body of the wearer, said means comprising a flexible permanently compression-resistant element located along a front edge of the collar in substantially fixed relation to said collar point; and a stretched elastic strip-shaped element having a tension diminishing from a maximum in the region of one end to a minimum in the region of the other end thereof and incorporated in said collar in such permanently stretched tension-creating condition and secured in such condition to said flexible permanently compression-resistant element between said flexible permanently compression-resistant element and the inner collar face and extending along said front edge of the collar from a point near the crotch of the collar toward the collar point with said first-mentioned end of said elastic strip-shaped element located near the crotch of the collar.

9. In a collar consisting of several collar plies sewn to each other along the front edges of the collar so as to form along said front edges inwardly turned compression-resistant stiffening seam portions extending from the crotch of the collar to the collar points, means for opposing the tendency of a collar point to curl away from the body of the wearer, said means being incorporated in said collar and including a stretched elastic strip-shaped element having a tension diminishing from a maximum in the region of one end to a minimum in the region of the other end thereof and secured in such permanently stretched tension-creating condition to an inwardly turned compression-resistant seam portion along a front edge of the collar, extending from a point near the crotch of said collar toward the collar point with said first-mentioned end of said elastic strip-shaped element located near the crotch of the collar and located between said inwardly turned compression-resistant seam portion and the inner collar ply.

10. In a collar consisting of one or more fabric plies, means for opposing the tendency of a collar point to curl away from the body of the wearer, said means comprising a flexible permanently stiffened compression-resistant fabric strip located along a front edge of the collar in substantially fixed relation to said collar point; and a stretched elastic strip-shaped element having a tension diminishing from a maximum in the region of one end to a minimum in the region of the other end thereof and incorporated in said collar in which permanently stretched tension-creating condition and secured in such condition to said flexible permanently stiffened compression-resistant fabric strip between said flexible permanently stiffened compression-resistant fabric strip and the inner collar face and extending along said front edge of the collar from a point near the crotch of the collar toward the collar point with said first mentioned end of said elastic strip-shaped element located near the crotch of the collar.

11. In a collar consisting of one or more fabric plies, means for opposing the tendency of a collar point to curl away from the body of the wearer, said means comprising a flexible permanently compression-resistant element located in the neighborhood of said collar point in substantially fixed relation to said collar point, and a stretched elastic strip-shaped element having a tension diminishing from a maximum in the region of one end to a minimum in the region of the other end thereof and incorporated in said collar in such permanently stretched tension-creating condition and secured in such condition to said flexible permanently compression-resistant element in the neighborhood of said collar point extending at least approximately toward the same and located between said flexible permanently compression-resistant element and the inner collar face with said first-mentioned end of said elastic strip-shaped element located further from the collar point and said other end thereof located nearer to the collar point.

12. In a collar including an outer collar ply, an inner collar ply and an interposed lining ply, means for opposing the tendency of a collar point to curl away from the body of the wearer, said means comprising a flexible permanently compression-resistant element incorporated in said collar located in the neighborhood of said collar point between said lining ply and said inner ply of said collar in substantially fixed relation to said collar point; and a stretched elastic strip-shaped element having a tension diminishing from a maximum in the region of one end to a minimum in the region of the other end thereof and incorporated in said collar in such permanently stretched tension-creating condition and secured in such position to said flexible permanently compression-resistant element in the neighborhood of said collar point extending at least approximately toward the same and located between said compression-resistant element and the inner collar ply with said first-mentioned end of said elastic strip-shaped element located further from the collar point and said other end thereof located near to the collar point.

13. In a collar including an outer and an inner collar ply, means for opposing the tendency of a collar point to curl away from the body of the wearer, said means comprising a flexible permanently compression-resistant element incorporated in said collar located between said collar plies in the neighborhood of said collar point in substantially fixed relation to said collar point; and a stretched elastic strip-shaped element having a tension diminishing from a maximum in the region of one end to a minimum in the region of the other end thereof and incorporated in said collar in such permanently stretched tension-creating condition to said flexible permanently compression-resistant element in the neighborhood of said collar point extending at least approximately toward the same and located between said compression-resistant element and the inner collar ply with said first-mentioned end of said elastic strip-shaped element located further from the collar point and said other end thereof located nearer to the collar point.

14. In a collar consisting of several collar plies sewn to each other along the edges of the collar so as to form along said edges inwardly turned stiffening seam portions, means for opposing the tendency of a collar point to curl away from the body of the wearer, said means being incorporated in said collar and including a stretched elastic strip-shaped element having a tension diminishing from a maximum in the region of one end of a minimum in the region of the other end thereof and secured in such permanently stretched tension-creating condition to an inwardly turned stiffening seam portion in the neighborhood of said collar point extending toward the same and located between said inwardly turned seam portion and the inner collar ply with said first-mentioned end of said elastic strip-shaped element located further from the collar point and said other end thereof located nearer to the collar point.

*15. In a collar consisting of one or more plies and having edge seams, means for opposing the tendency of a collar point to curl away from the body of the wearer, said means being permanently incorporated in said collar and including a permanently elastically stressed elastic strip-shaped element having an elastic stress diminishing from a maximum in the region of one end to a minimum in the region of the other end thereof, thereby creating in said strip-shaped element a curving tendency which is in the direction of one face of said strip-shaped element and which diminishes from said one end to said other end thereof, said elastically stressed elastic strip-shaped element secured in such elastically stressed condition in the collar along an edge seam thereof extending toward the point of said collar with said other end of said elastic strip-shaped element located near the point of the collar and with said one face thereof facing the inner face of the collar.*

*16. In a collar consisting of several collar plies sewn to each other along the front edges of the collar from the crotch of the collar to the collar points so as to form seams along said front edges, means for opposing the tendency of a collar point to curl away from the body of the wearer, said means being permanently incorporated in said collar and including a permanently elastically stressed elastic strip-shaped element having an elastic stress diminishing from a maximum in the region of one end to a minimum in the region of the other end thereof, thereby creating in said strip-shaped element a curving tendency which is in the direction of one face of said strip-shaped element and which diminishes from said one end to said other end thereof, said elastically stressed elastic strip-shaped element secured in such permanently elastically stressed condition in the collar along one of the seams thereof and extending along a front edge of the collar from a point near the crotch of said collar toward the collar point with said one end of said elastic strip-shaped element located near the crotch of the collar and with said one face thereof facing the inner face of the collar.*

BENJAMIN LIEBOWITZ.

REFERENCES CITED

The following references are of record in the file of this patent or the original patent:

UNITED STATES PATENTS

| Number | Name | Date |
|---|---|---|
| 328,207 | Fulmer | Oct. 13, 1885 |
| 2,132,616 | Hardie | Oct. 11, 1938 |
| 2,186,356 | Bihaly | Jan. 9, 1940 |
| 2,298,071 | Smith | Oct. 6, 1942 |